FIG. I

July 29, 1969 J. D. AINSWORTH 3,458,795
CIRCUIT FOR CONTROLLING THE APPLICATION OF FIRING PULSES TO
CONTROLLED DEVICES IN A STATIC CONVERTOR OPERATING
IN THE INVERSION MODE
Filed May 5, 1967 4 Sheets-Sheet 2
FIG.2
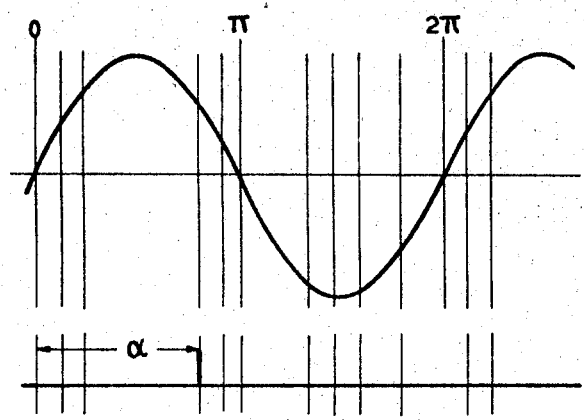
(a)
(b)
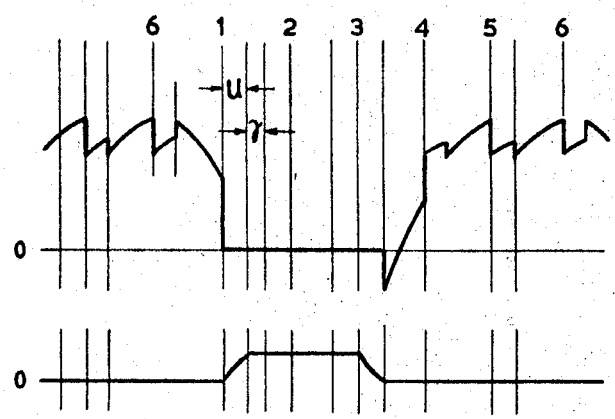
(c)
(d)
(e)
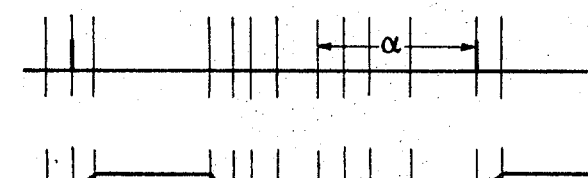
(f)
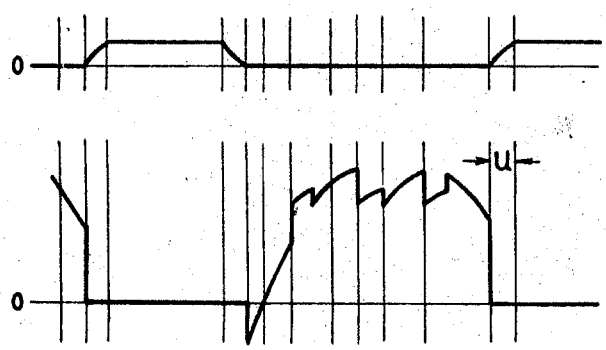
(g)

United States Patent Office 3,458,795
Patented July 29, 1969

3,458,795
CIRCUIT FOR CONTROLLING THE APPLICATION OF FIRING PULSES TO CONTROLLED DEVICES IN A STATIC CONVERTER OPERATING IN THE INVERSION MODE
John Desmond Ainsworth, Stafford, England, assignor to The English Electric Company Limited, London, England, a British company
Filed May 5, 1967, Ser. No. 636,396
Claims priority, application Great Britain, May 6, 1966, 20,276/66
Int. Cl. H02m 7/00, 1/18
U.S. Cl. 321—5                                 6 Claims

ABSTRACT OF THE DISCLOSURE

A circuit for controlling the application of firing pulses to controlled devices, e.g. thyristors or mercury valves, in a static convertor operating in its inversion mode. In particular, it comprises control means for developing the firing pulses at an instant corresponding to a predetermined position occupied by each cycle of a waveform derived from a combination of components which are functions of the direct current flowing in the D.C. side of the "invertor" at a time instant immediately preceding the firing instant and the voltage across the device at the said time instant. The circuit is inherently predictive in its action and the object fulfilled by this invention is to so control the firing instants that the margin angle (defined herein) is maintained substantially constant even under conditions of asymmetry.

---

This invention relates to a circuit for controlling the application of firing pulses to controlled devices, e.g. thyristors or mercury valves, in a static convertor operating in its inversion mode, i.e. converting D.C. to A.C.

From one aspect, the present invention consists in a circuit for controlling the application of firing pulses to a controlled device in a static invertor, comprising means for developing said pulses at an instant corresponding to a predetermined position occupied by each cycle of a waveform derived from a combination of components which are functions of the direct current flowing through the D.C. side of the invertor at a time instant immediately preceding the firing instant and the voltage across the device at the said time instant.

The component which is a function of the direct current is preferably dependent on both the instantaneous value and the rate of change of said current at the said time instant. The component which is a function of the voltage may conveniently be derived from a simulated voltage waveform which is the same shape as, and is in phase with, the actual voltage across the controlled device, e.g. a mercury-pool valve or a thyristor, the waveform being passed through a network phase-advancing this waveform by a predetermined amount. The resulting current waveform at the output of this network may then serve as that desired by having the datum about which it alternates shifted by an amount dependent on the magnitude of the said direct current components, the said predetermined position occurring on this waveform being a selected instant at which it now crosses its former datum.

One of the principal advantages of this invention is that by controlling the firing instants or firing angle ($\alpha$), the margin angle $\gamma$ may be maintained substantially constant even under conditions of varying current and voltage, including transients and asymmetry, whereas previously it has been necessary to maintain the firing angle $\alpha$ at an artificially low value in order to maintain a comparable degree of protection from malfunction caused by insufficient valve de-ionisation time.

With regard to the above terms, the firing angle $\alpha$ is defined as the amount, in electrical degrees, by which the instant of firing any particular valve is delayed following its instant of natural commutation, that is, the instant at which its anode potential rises above its cathode potential, and the margin angle $\gamma$ is the permitted amount, in electrical degrees, during which the valve is to de-ionise completely before its anode potential again rises above its cathode potential.

Figure 1:
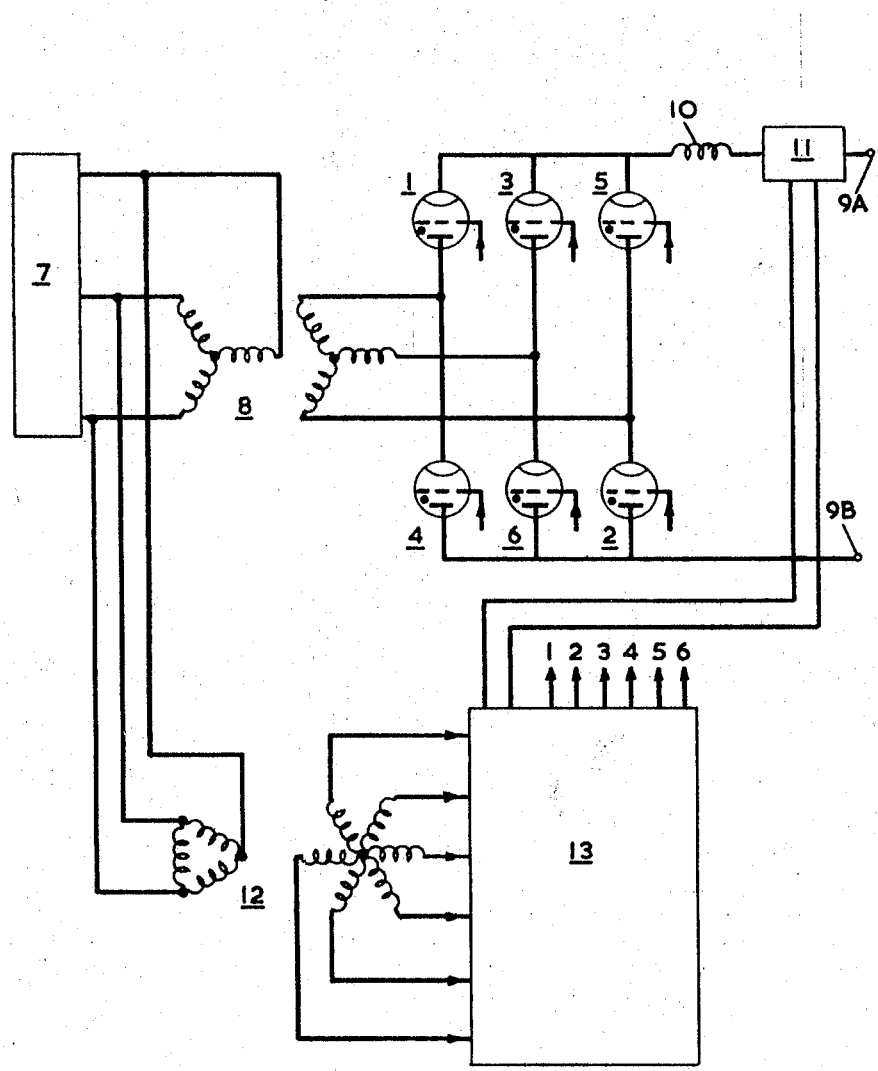
Figure 3:
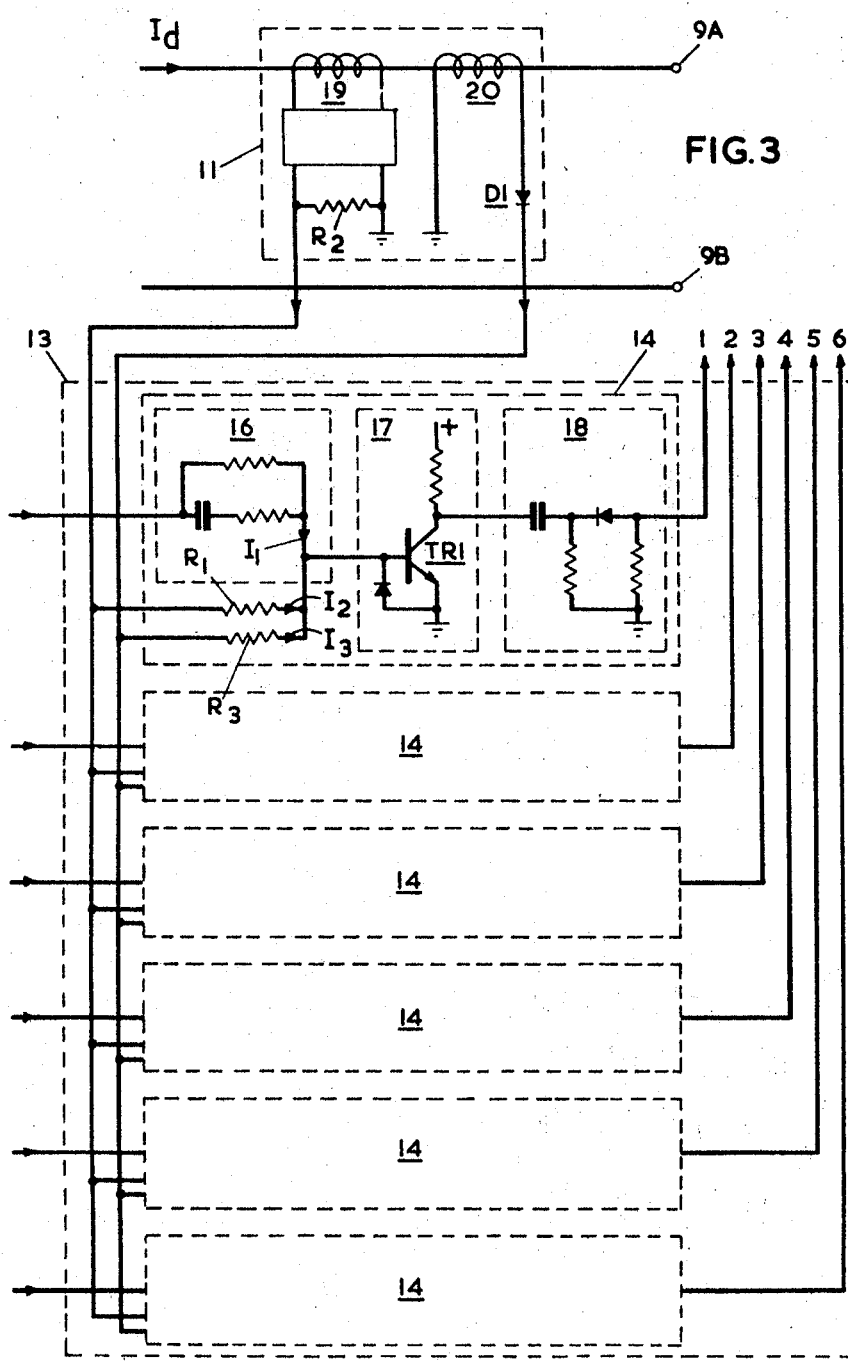
Figure 4:
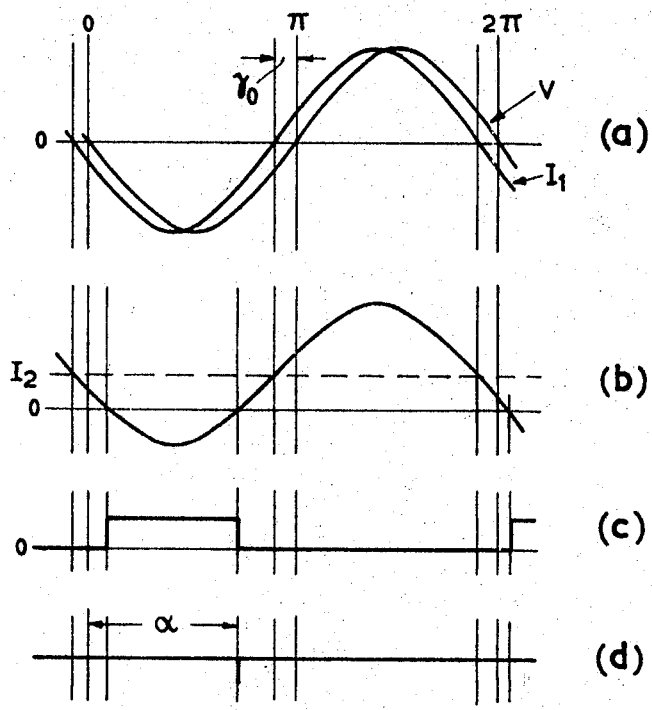
Figure 5:
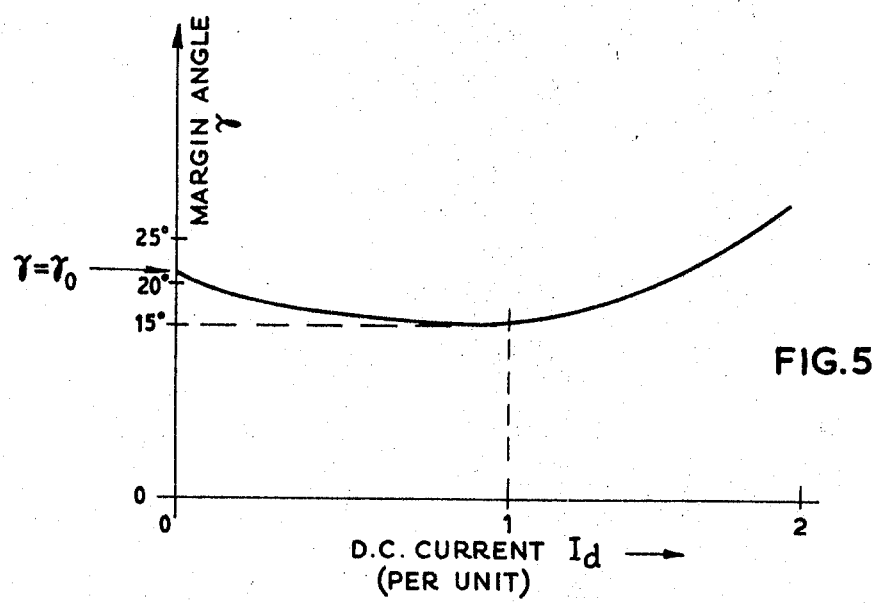

In order that the invention may be fully understood, one embodiment thereof will now be described with reference to the accompanying drawings, in which:

FIGURE 1 is a schematic diagram of an overall six-phase convertor circuit;

FIGURES 2(a) to 2(g) show waveforms for valves 1 and 5 under normal steady-state operation whilst inverting;

FIGURE 3 is a schematic diagram of the control circuit employed in FIGURE 1;

FIGURES 4(a) to 4(d) show waveforms obtained at various parts of the control circuit shown in FIGURE 3; and FIGURE 5 is a graph showing slight variations in the margin angle $\gamma$ with changes in direct current.

Referring now to FIGURE 1, there is shown a six-pulse convertor circuit having six controlled mercury-pool valves 1 to 6. More particularly, the circuit includes a three-phase A.C. power supply 7 the output of which is applied to a star-connected primary of a converter transformer 8, the secondary windings of which are respectively connected to the anode-cathode junctions of series-connected valves 1 and 4, 3 and 6, and 5 and 2. The cathodes of valves 1, 3 and 5 are connected together to a D.C. terminal 9A through a smoothing reactor 10 and a monitoring circuit 11, and the anodes of the valves 4, 6 and 2 are connected together to the other D.C. terminal 9B.

The output from the A.C. power supply 7 is also applied to a delta-connected primary winding of a voltage transformer 12, the secondary winding being connected in diametral star so as to provide a six-phase input to a grid control circuit 13 for governing the firing angle $\alpha$ of the valves.

For values of $\alpha$ between 0° and 90° the convertor is rectifying, the mean D.C. voltage of the convertor being proportional to cos $\alpha$, and the convertor is inverting for values of $\alpha$ between 90° and 180°, this invention being concerned with this latter phase of operation.

FIGURES 2(a) to (g) show typical waveforms for valves 1 and 5 under normal steady-state operation whilst inverting. FIGURE 2(a) shows the A.C. supply voltage corresponding to the voltage between the anodes of valves 1 and 5. FIGURE 2(b) shows the firing pulse applied to valve 1 at $\alpha=145°$, and at this instant the anode-cathode voltage of valve 1 collapses almost to zero (FIGURE 2(c)) and anode current flows (FIGURE 2(d)). The firing pulses for valve 5 are shown in FIGURE 2(e). Commutation of current from valve 5 to valve 1 commences at time $\alpha/w$ and terminates at time $(\alpha+u)/w$, where time is measured from the instant of natural commutation of valve 1 and $w=2\pi \times$ supply frequency. The anode current of valve 5 (FIGURE 2(f)) falls from, and the anode current of valve 1 rises to, the D.C. line current value $I_d$ in a finite time $u/w$, $u$ being the commutation overlap angle, e.g. 20°. At the time instant $(\alpha+u)/w$ the anode-cathode voltage of valve 5 (FIGURE 2(g)) jumps negative and then rises positively, the negative-positive transition occurring at $\pi/w$. The time interval between current zero $(\alpha+u)/w$ and the negative-positive voltage transition, measured in electrical degrees, is known as the margin angle $\gamma$, e.g. 15°, and, as mentioned above, is necessary in order to allow the valve to de-ionise before the anode voltage becomes positive to the cathode again.

Accordingly, $\gamma$ must be larger than the de-ionisation time of the valve and in order to ensure this, it is possible to use a sufficiently small fixed value, or at least a fixed maximum value, e.g. 140°, if variable control is employed, of firing angle $\alpha$. However too small a value of $\alpha$ has two main disadvantages:

(a) It reduces the maximum possible D.C. voltage during inversion, and hence reduces the available power rating.

(b) The reactive power in the A.C. system (which is approximately proportional to sin $\alpha$) ($\alpha > 90°$) may be excessive; this is particularly important for h.v. D.C. invertors.

Now it is known from classical converter theory that, under steady-state conditions, $$\cos \alpha - \cos (\alpha+u) = xI_d/v$$

where
$x$=transformer leakage reactance, per unit.
$I_d$=D.C. current, per unit.
$v$=A.C. voltage, per unit.

Hence, for given values of $\alpha$ and $x$, the value of $u$ progressively increases with either an increase in $I_d$ or a decrease in $v$; accordingly, $\gamma$ progressively decreases since $\alpha+u+\gamma=180°$.

If the maximum possible value of $\alpha$ is required, for the reasons given in (a) and (b) above, then $\gamma$ ideally should be held constant at a value just sufficient for de-ionisation and the firing angle $\alpha$ adjusted, in dependence on changes in $I_d$ and $v$, such that $\alpha+u=180-\gamma$.

Whilst it is theoretically possible to construct rather complicated control circuits to perform this function under ideal symmetrical steady-state conditions, it is not possible to construct a control circuit which will always perform perfectly under transient conditions since the commutation overlap angle $u$ or the negative-positive voltage transition may be modified if the transient occurs between the instants $\alpha/w$ to $\pi/w$ and it is then too late to alter the firing angle $\alpha$.

However, the control circuit described below with references to FIGURES 3 and 4(a) to 4(d) gives a relatively simple practical compromise, the circuit having a reasonable degree of predictive action under transient conditions and with distorted A.C. voltage waveforms, whilst giving a substantially constant margin angle $\gamma$ under normal conditions.

Referring now to FIGURE 3, the control circuit 13 comprises six stages 14, one for each valve 1 to 6, for determining the firing angle $\alpha$ for those valves. Each stage includes a phase advance network 16, an amplifier-limiter 17 and a differentiator 18.

The operation of the circuit will be described with reference to the stage associated with valve No. 1, the operation of the other stages being identical.

More particularly, the A.C. voltage input to the phase advance network 16 from transformer 12 is chosen to be proportional to, and in phase with, the voltage between the anodes of valves 1 and 5 on no-load, c.f. FIGURE 2(a) and the output current $I_1$ from this network is such that it phase advanced by a predetermined angle $\gamma_0$ at the supply frequency. These voltage and current waveforms are shown in FIGURE 4(a). To this current $I_1$ are added currents $I_2$ and $I_3$, current $I_2$ being proportional to the main converter current $I_d$ and current $I_3$ being proportional to the rate of change of converter current $dId/dt$. Current $I_2$ is obtained via a resistor R1 connected to a current shunt R2 in the output of a D.C. current transformer 19 in the monitoring circuit 11, and current $I_3$ is obtained, through a diode D1 via a resistor R3 connected to a differentiating current transformer 20, that is, a current transformer having an air-gapped core operated on substantially open-circuit, resistor R3 being high.

The total current $(I_1+I_2+I_3)$ is therefore applied to the base of transistor TR1 in the amplifier-limiter 17, FIGURE 4(b), normal steady state conditions being assumed with $I_d$, so that $I_2$ is constant and $I_3$ is zero. The output of the limiter 17 is a square wave (FIGURE 4(c)) and this output is differentiated (FIGURE 4(d)) by differentiator 18 and the negative-going pulses applied to the grid of valve No. 1.

With particular reference to FIGURE 4, it will be seen that the current $I_1$ crosses zero, going positive, at a time $wt=180°-\gamma_0$, (FIGURE 4(a)), but the total current applied to the amplifier-limiter 17 (FIGURE 4(b)) crosses zero at an earlier time depending on the magnitude of $I_2$ (which is proportional to the line current $I_d$), and it is at this earlier time that the firing pulse is produced (FIGURE 4(c)).

Although the value of $\gamma$ will be substantially constant under normal conditions of operation, it will in fact vary with variations in current and voltage in a manner determined by the convertor transformer reactance, by the current and voltage transformer ratios and the value of $\gamma_0$, being equal to $\gamma_0$, e.g. 21°, at zero current $I_d(I_2=0)$.

A graph of typical changes in the value of $\gamma$ with changes in the current $I_d$ is shown in FIGURE 5, from which it will be seen that as the current rises to its rated value, $\gamma$ falls to a minimum value, e.g. 15°, and then progressively rises with increases in the current above the rated value.

The higher margin angles $\gamma$ produced at low current values is a disadvantage since the reactive power is greater than the minimum theoretically possible, although the resultant rise in reactive power is very small since the current is low, but the higher values of $\gamma$ at high current is an advantage since it gives a greater margin during transient overcurrents.

The actual value of the phase advance $\gamma_0$ is determined by the network 16. A first order linear network is suitable in this case, the transfer function being $$I_1 = V_1 K((1+jwT_2)/(1+jwT_1))$$

where
$V_1 \pm$ input voltage to network, and
$K$, $T_1$ and $T_2$ are constants
the phase advance being given by $$\gamma_0 = \tan^{-1}(w(T_2-T_1)/(1+w^2T_1T_2))$$

The circuit may not always have a perfect sine-wave input, since transients may appear on the waveform $V_1$. For example, with reference to FIGURE 2(c) the transient occurring closest in time to $\alpha/w$ for valve 1 will be due to the completion of commutation of valve 6 at 40° electrical earlier ($u=20°$), and it is preferable for the response time-constant $T_1$ to be much shorter than this. However, too small a value of $T_1$ may give an excessive transfer of suddent transient steps in the ratio $$I_1 = V_1 K T_2/T_1$$

and accordingly a reasonable compromise is obtained by making $\gamma_0=21°$, when $wT_1=0.31$ and $wT_2=0.79$ at normal frequency.

Since this circuit is operative to take irrevocable action at a time $wt=\alpha$ to control events taking place subsequently up to the time $wt=(\alpha+u+\gamma)$, it must be inherently predictive, and this function is attained by detecting any rate of change ($I_3$) in the line current $I_d$. If this feature were not provided, then the circuit might permit too small a value of γ, leading to commutation failure, if the line current were rising, since the circuit would determine the required value of α, and the appropriate value of overlap angle $u$ and thus γ, on the basis of the instantaneous value of $I_2$ (which is proportional to $I_d$) at that instant ($wt=\alpha$), whereas the actual angle $u$ is approximately proportional to the average value of $I_d$ from $wt=\alpha$ to $wt+(\alpha+u)$ which in the case of a rising $I_d$, would be higher, γ then being smaller.

This possible error may be overcome, as mentioned above, by the addition of $I_3$ which is proportional to $dI_d/dt$, in fact this value of $I_3$, relative to $I_2$, may be chosen so that the value of $I_2+I_3$ is proportional to the average value of $I_d$ over a time $u_1/w$ (assuming $dI_d/dt$ to be constant), where $u_1$ is the value of $u$ at the normal rating.

For a falling current $I_d$, the $dI_d/dt$ component should theoretically be maintained but in practice the diode D1 removes this component in case the fall should subsequently reverse; this may give a slightly higher value of γ, during transients, then is necessary.

This circuit may conveniently be incorporated in the convertor described in our copending U.S.A. patent application No. 636,398, filed on the same date as the current application and assigned to the same assignees as in this application, in which case the value of α referred to would be $\alpha_{max}$.

Although this invention has been described with reference to a three phase two-way (six pulse) convertor, it will be appreciated that the invention is equally applicable to an $m$ phase $n$-way convertor where $m$ and $n$ is any digit, including one, and although reference has been made throughout to grid-controlled valves, e.g. mercury-pool valves, it is to be understood that thyristors could equally well be employed.

Furthermore, the invention is also applicable to other industrial rectifier applications, such as motor control, where regeneration is required.

I claim:

1. A circuit for controlling the application of firing pulses to controlled devices in a static convertor during the inversion mode in which conversion is effected between D.C. and A.C., comprising
   sensing means for deriving a waveform from a combination of components which are operating functions of the converter, said sensing means including,
   a D.C. current transformer for deriving a component proportional to the instantaneous value of the direct current flowing in the D.C. side of the convertor at a time instant immediately preceding the firing instant of a selected device,
   a differentiating current transformer for deriving a component proportional any rate of change of said direct current at the said time instant,
   monitoring means for deriving a component dependent on the voltage across the associated device at the said time instant, said monitoring means comprising
   an A.C. transformer for determining this voltage across the said associated device and
   a phase advance network for advancing the phase of the alternating voltage by a predetermined amount at a specified frequency of said voltage, and
   control means for developing said firing pulses at a time corresponding to a predetermined position occupied by each cycle of said waveform.

2. A circuit according to claim 1, wherein said sensing means further comprises
   a summing network for summing the outputs from the said differentiating and current transformers and the output from the phase advance network, whereby the datum about which the voltage from this network alternates is displaced from a first level to a second level determined by the summed output from these two transformers, the predetermined position at which the pulses are developed by said control means being the point at which the waveform traverses the said first level in a positive-going sense.

3. A circuit according to claim 2, for controlling the application of firing pulses to controlled devices in an invertor designed for multi-phase $p$-pulse operation, the invertor comprising
   $p$ controlled devices arranged in $m$-phase $n$-way configuration, the said sensing means being provided in common for a plurality ($p$) of control devices whereby sequentially to develop separate firing pulses for the $p$ devices.

4. A circuit for controlling the application of firing pulses, during the inversion mode, to controlled devices in a static convertor for effecting conversion between D.C. and A.C. in a high voltage D.C. transmission system, comprising
   first sensing means for deriving a component which is dependent on both the instantaneous value, and the rate-of-change, of the direct current flowing in the D.C. side of the convertor at a time instant immediately preceding the firing instant of a selected device,
   second sensing means for deriving a component dependent on the voltage across the associated device at the said time instant, said second sensing means comprising
   an auxiliary transformer on the A.C. side of the convertor for determining the said voltage across the device, and
   a phase advance network for advancing the phase of this voltage by a predetermined amount at a specified frequency,
   a summing network for adding together the outputs from the first and second sensing means whereby to derive a composite waveform, the datum about which the voltage from the auxiliary transformer alternates thereby being displaced from a first level to a second level in response to the summation performed by this summing network, and
   control means for developing said firing pulses at times corresponding to the positions at which the waveform traverses the said first level in a positive-going sense.

5. A circuit for controlling the application of firing pulses to controlled devices in a static convertor during the inversion mode in which conversion is effected between D.C. and A.C., comprising
   a D.C. current transformer for deriving a component proportional to the instantaneous value of the direct current flowing in the D.C. side of the converter at a time instant immediately preceding the firing instant of a selected device,
   a differentiating current transformer for deriving a component proportional any rate of change of said direct current at the said time instant,
   sensing means for deriving an alternating component corresponding to the voltage across the associated device at the said time instant,
   a summing network for adding together these three components whereby to derive a composite waveform, and
   control means for developing said firing pulses at a time corresponding to a predetermined position occupied by each cycle of said waveform.

6. A circuit according to claim 5, wherein said sensing means comprises
   an auxiliary transformer on the A.C. side of the convertor for determining the said voltage across the device, and
   a phase advance network for advancing the phase of this voltage by a predetermined amount at a specified frequency the datum about which this voltage alternates thereby being displaced from a first level to a second level in response to the summation performed by the summing network, the predetermined position at which the pulses are developed by said control means being the point at which the waveform traverses the said first level in a positive-going sense.

References Cited

UNITED STATES PATENTS

| | | | |
|---|---|---|---|
| 3,330,998 | 7/1967 | Winograd | 315—194 X |
| 3,351,838 | 11/1967 | Hunter | 321—5 |
| 3,359,481 | 12/1967 | Bjork | 321—27 |
| 3,365,613 | 1/1968 | Hammerlund | 315—350 |

FOREIGN PATENTS 904,210  2/1954  Germany.

JOHN F. COUCH, Primary Examiner

W. H. BEHA, Jr., Assistant Examiner

U.S. Cl. X.R.

321—13, 38